United States Patent [19]

van de Nieuwelaar et al.

[11] Patent Number: 4,765,028
[45] Date of Patent: Aug. 23, 1988

[54] DEVICE FOR THE EJECTION OF A POULTRY CARCASS

[75] Inventors: Josephus A. van de Nieuwelaar, Gemert; Petrus C. H. Janssen, Wilbertoord, both of Netherlands

[73] Assignee: Stork PMT B.V., Netherlands

[21] Appl. No.: 47,206

[22] Filed: May 6, 1987

[30] Foreign Application Priority Data

May 9, 1986 [NL] Netherlands .................... 8601179

[51] Int. Cl.4 .......................................... A22C 21/00
[52] U.S. Cl. .......................................... 17/11; 17/44.1
[58] Field of Search .................... 17/11, 44.1, 44.2

[56] References Cited

U.S. PATENT DOCUMENTS 3,593,368 7/1971 Cox ........................................ 17/44.1
4,646,384 3/1987 Van der Eerden .............. 17/44.1 X Primary Examiner—Willie G. Abercrombie
Attorney, Agent, or Firm—Hurt, Richardson et al.

[57] ABSTRACT

A device for the ejection of a poultry carcass hanging on a conveyor track with two oblong outer gudies and a guide surface opposite them for confining a leg of a bird in which of two guides of the same type (inner or outer guides) part of this guide, greater in length than the diameter of the leg, is formed by a supporting element which is movable transversely to the guide, said supporting elements lying opposite each other and being joined together in such a way that they can move together in the same direction.

5 Claims, 7 Drawing Sheets

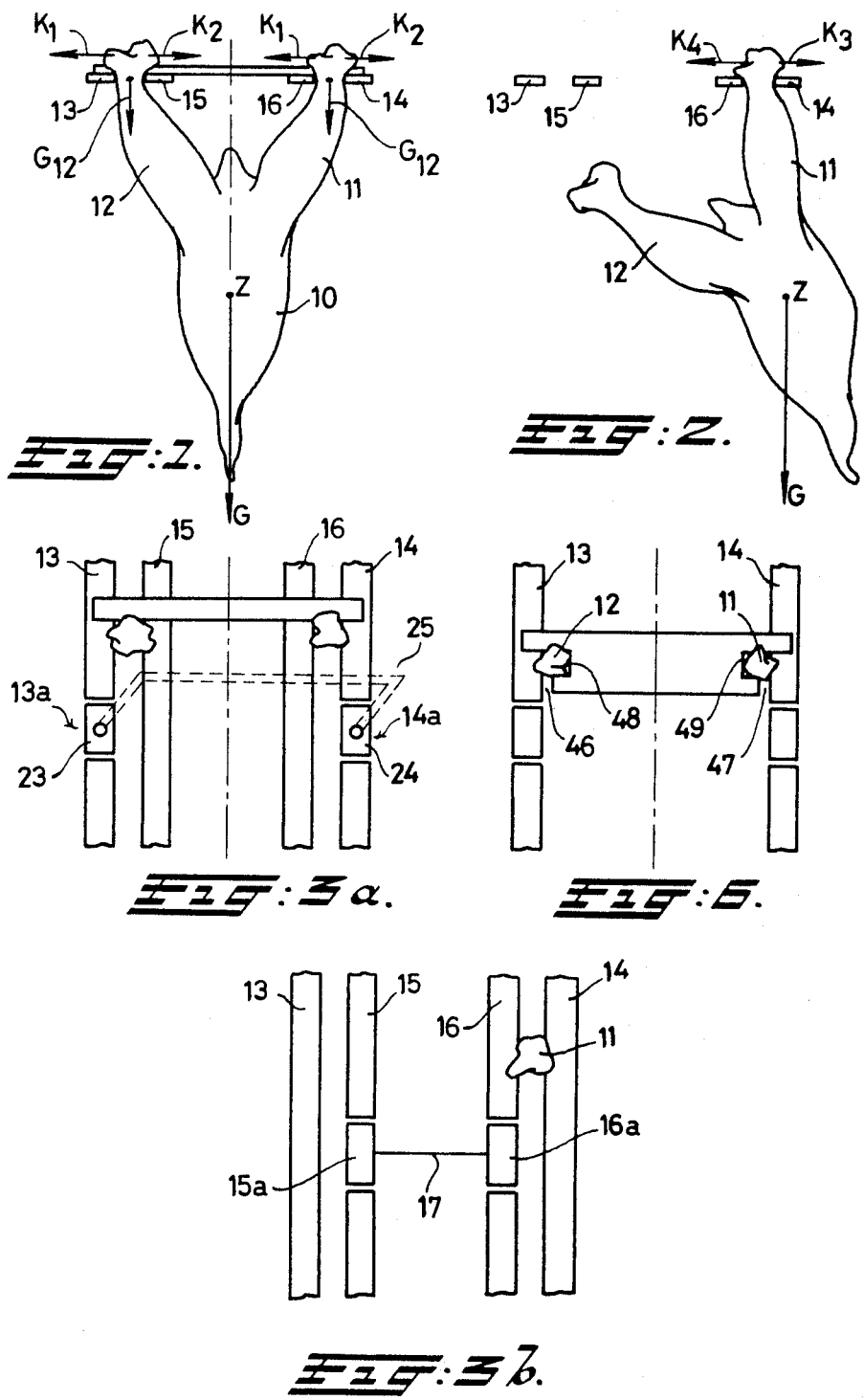

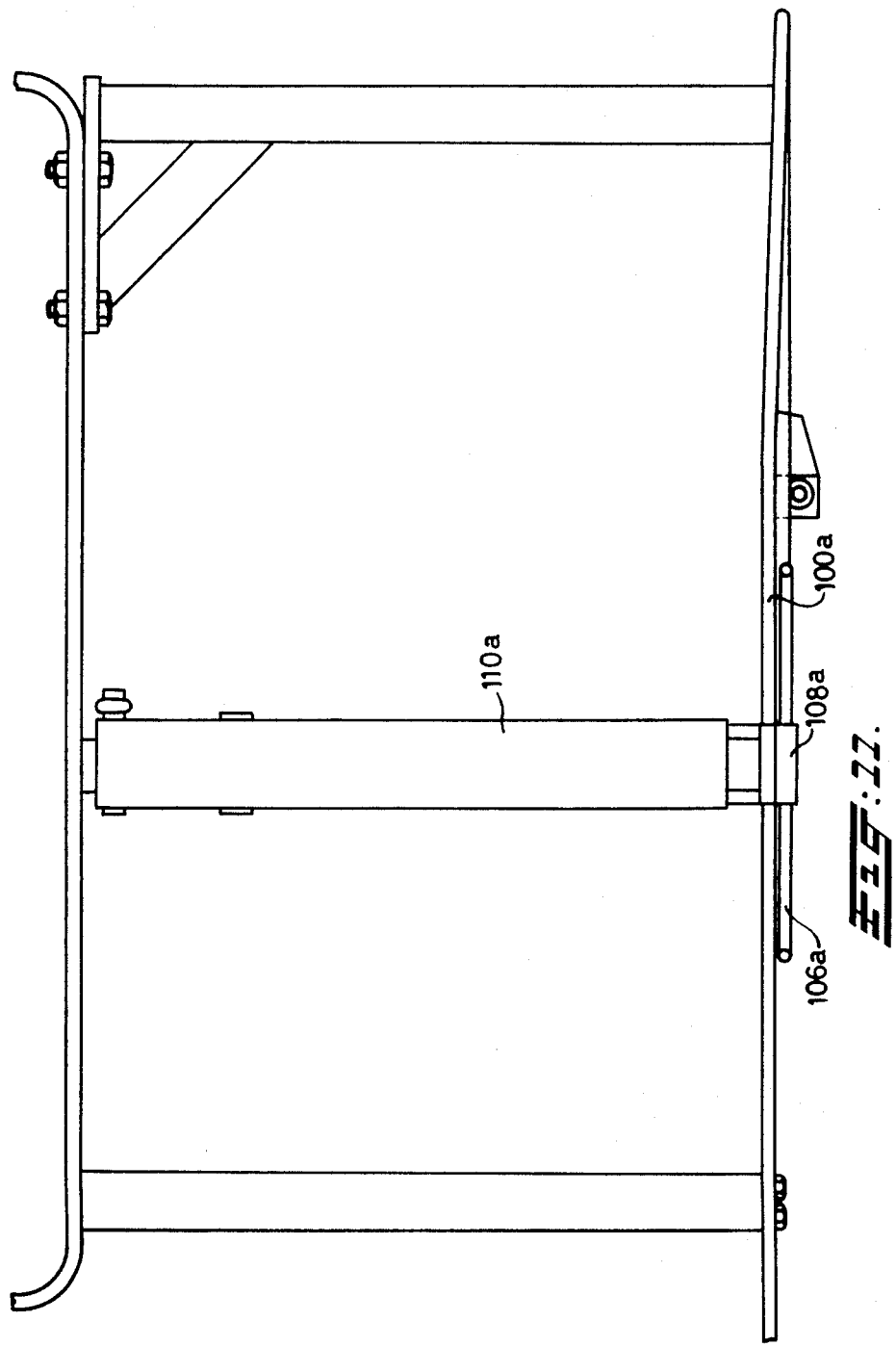

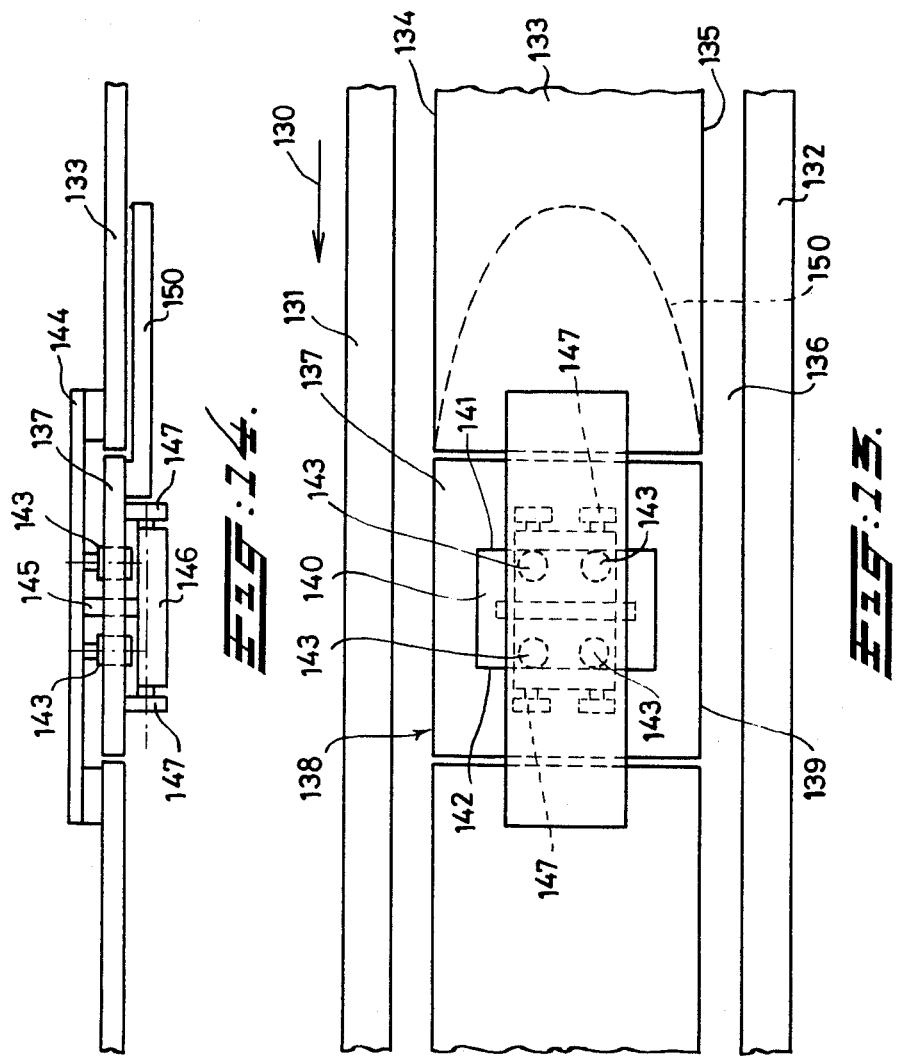

4,765,028

DEVICE FOR THE EJECTION OF A POULTRY CARCASS

BACKGROUND OF THE INVENTION

The invention relates to a device for the ejection of a poultry carcass which is being moved, suspended by one leg, along a conveyor track of the type comprising two oblong outside guides which are situated at a distance from each other and each cooperate with a guide or guide surface situated at a short distance opposite them for confining between them a leg of a bird being moved along the guides by means of a pressure piece.

Devices in which poultry suspended by both legs is moved along a conveyor track of the above described type and thereby undergoes a number of processing operations in a number of successive processing stations are generally known. It is, of course, essential here for the bird to be conveyed through the processing stations actually hanging by both legs, otherwise the poultry, which undergoes many processing operations in these processing stations, is divided into parts which are unfit for further processing.

The poultry carcass is fed into the conveyor track manually or automatically. In view of the speed at which this has to take place, it is inevitable that some carcasses are going to be fed in incorrectly, so that the carcass is hanging by only one leg. It is therefore important to have a device which, immediately following the infeed, automatically removes from the conveyor track those carcasses which are hanging by only one leg. The object of the invention is to produce such a device.

SUMMARY OF THE INVENTION

The device according to the invention is to this end characterized in that of two guides of the same type (inside or outside guides) part of this guide, greater in length than the diameter of the leg, is formed by a supporting element which is movable transversely to the guide, said supporting elements lying opposite each other and being joined together in such a way that they can move together in the same direction. Preferably the supporting elements are guided for carrying out movements parallel to the longitudinal axis of the guide, while each of the supporting parts can be connected to the end of one of the legs of a U-shaped yoke.

In another embodiment each of the supporting elements is connected to the bottom end of a rocking arm supported hingedly between the ends thereof, the top ends of which rocking arms are connected to each other by means of a connecting arm. Preferably two oblong spring elements extend at the respective supporting parts over the guides and cross them at an acute angle for the purpose of exerting a force on the legs which is directed to the outside of the guide.

According to another preferred embodiment the supporting elements of the inner guides are guided in a bridge carried by the inner guides and connected to a lead-in part converging contrary to the direction of movement of the track.

DESCRIPTION OF THE DRAWINGS

FIGS. 1 and 2 are schematic illustrations by means of which the principle on which the application is based is explained;

FIG. 3a is a schematic top view of a first embodiment;

FIG. 3b is a schematic top view of a second embodiment;

FIG. 6 is a schematic top view of an embodiment in which part of the supports is formed by supporting faces in the carriers of the conveyor track;

FIG. 11 is a schematic side view of this embodiment;

FIG. 12 is an end view of this embodiment;

FIG. 13 is a top view of a third practical embodiment; and

FIG. 14 is a side view of this embodiment.

FIG. 1 shows a carcass 10 of slaughtered poultry which is hanging by both legs 11, 12 on a conveyor track, which consists of the outer guides 13, 14 and the inner guides 15, 16 with the leg 11 being confined between the guides 14 and 16, while the leg 12 is confined between the guides 13 and 15. The bird is moved by the action of a carrier 17 which rests on the guides 13–16 and, moving perpendicular to the plane of the drawing, presses against the legs.

Figure 4:
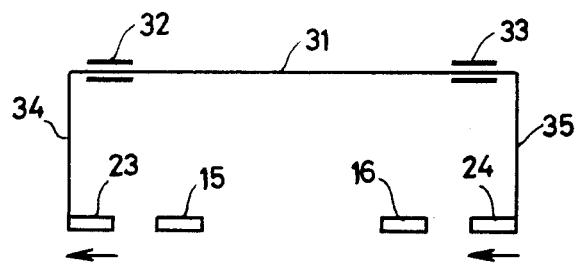
FIG. 4 shows schematically a first method of joining the supporting elements.

The weight G acts in the center of gravity Z of the bird. The force G/2 acts on each of the joints, resulting in equal forces $U_1$ and $U_2$, exerted by respective joints on the guides. The forces exerted on the movable, interlinked supporting parts are thus equal and opposed in direction; the supporting parts remain at rest during passing of the bird.

When, however, the bird is suspended by one leg, as shown in FIG. 2, where the bird is hanging by leg 11, not only are the forces $K_3$ and $K_4$ exerted by the joint of the leg 11 on the guides 14 and 16 respectively twice as great, but also the force exerted on the movable supporting part of the guide on which the bird is hanging is no longer compensated for by a force in the opposite direction on the other supporting part; the supporting part gives way and the bird falls away.

FIG. 3a shows how the two outer guides 13 and 14 are interrupted at 13a and 14a respectively; the interruption is filled with supporting elements 23 and 24 respectively. As shown by the dashed line 25, these are interconnected and supported in such a way that they can carry out movements perpendicular to the longitudinal direction of the guides 13 and 14.

When a bird hanging by the two legs 11,12 now passes the supporting elements 23, 24, equal, outward-directed forces are exerted on the two supporting elements, so that they will not move out of the plane of the guides 13, 14 and the bird passes the supporting elements unimpeded. If, however, a bird is conveyed in hanging by only one leg, such as, for example in the situation in FIG. 2, where the bird is hanging by leg 11, the supporting element 24 will be able to give way outwards unimpeded, because there is a bird leg between the supporting element 23 and the guide 15; the result will be that the bird falls away and is thus ejected.

FIG. 3b shows uninterrupted outer guides 13 and 14, and inner guides 15 and 16, in each of which there is a supporting element 15a, and 16a respectively, interconnected by means of the connection 17. When a bird hanging by one leg passes, the supporting element in question will give way, and the bird will fall out of the conveyor track.

FIG. 4 shows schematically a possible connection of the supporting elements 23, 24, by means of a U-shaped yoke with the horizontal leg 31 guided in the guides 32, 33, and the two vertical legs 34, 35 fastened to the supporting element 23 and the supporting element 24 respectively.

Figure 5:
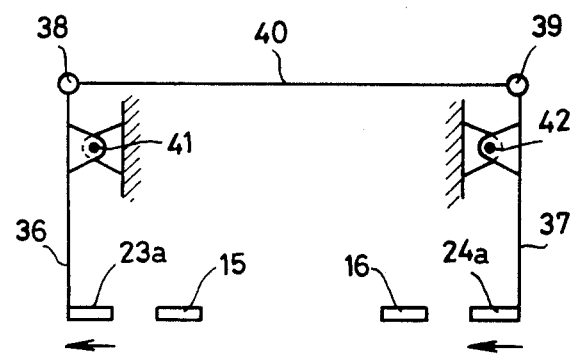
FIG. 5 shows schematically a second method of joining the supporting elements.

FIG. 5 shows a different method of connection, in particular suitable for heavier birds: here the supporting elements 23a, 24a are each connected to the ends of a rocking arm 36, 37 respectively, the top ends of which are connected by means of hinges 38, 39 to the ends of a coupling rod 40, while the rocking arms 36, 37 are supported between their ends in hinges 41, 42.

FIG. 6 shows how the invention can also be used in a conveyor track with fixed outer guides 13, 14 which function in conjunction with a specially formed drive element 45 of the type known from EU-No. 0.159.731. Such a drive element 45 has recesses 46, 47, whose longitudinal edges 48, 49 mate with the fixed guides 13 and 14 lying opposite them for supporting the legs 11, 12 of the birds. Of course, the operation of the device according to the invention in conjunction with such drive elements 45 is entirely the same as described above.

Figure 7:
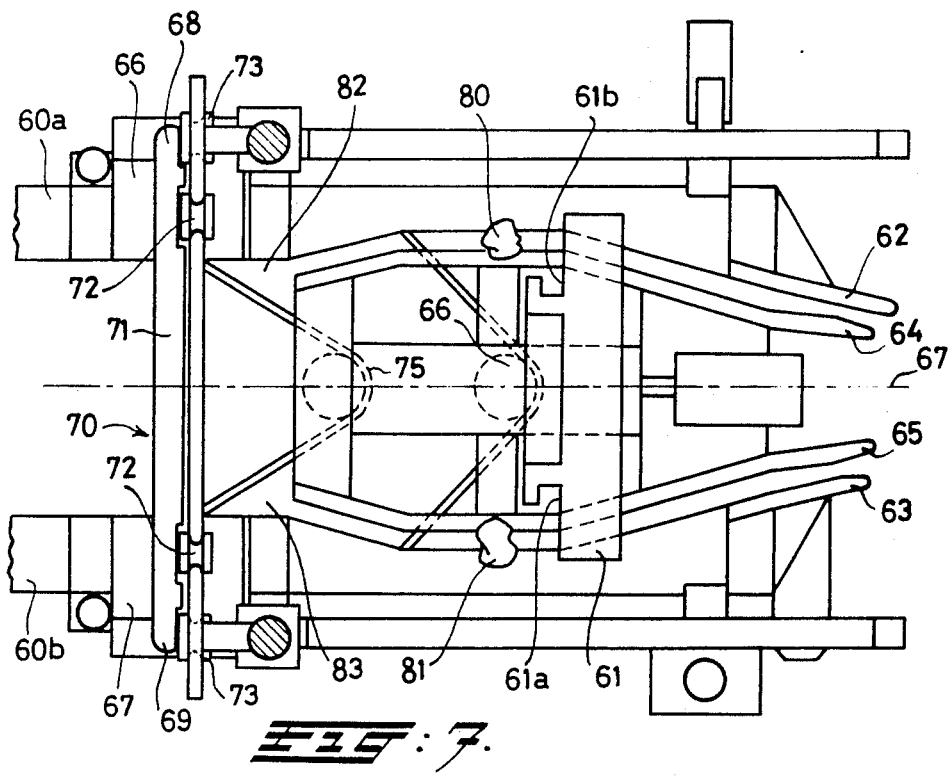
FIG. 7 is a top view of a first practical embodiment according to the invention.
Figure 8:
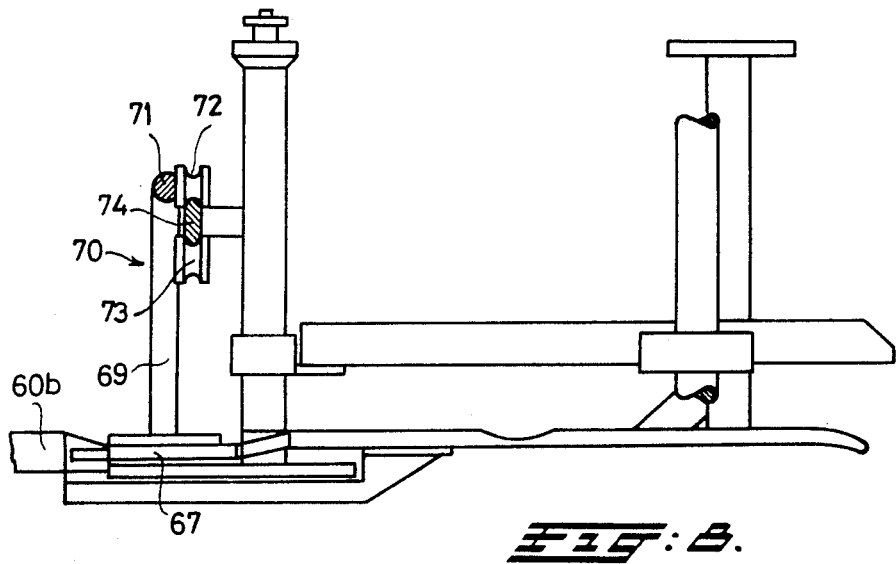
FIG. 8 is a side view of this embodiment.
Figure 9:
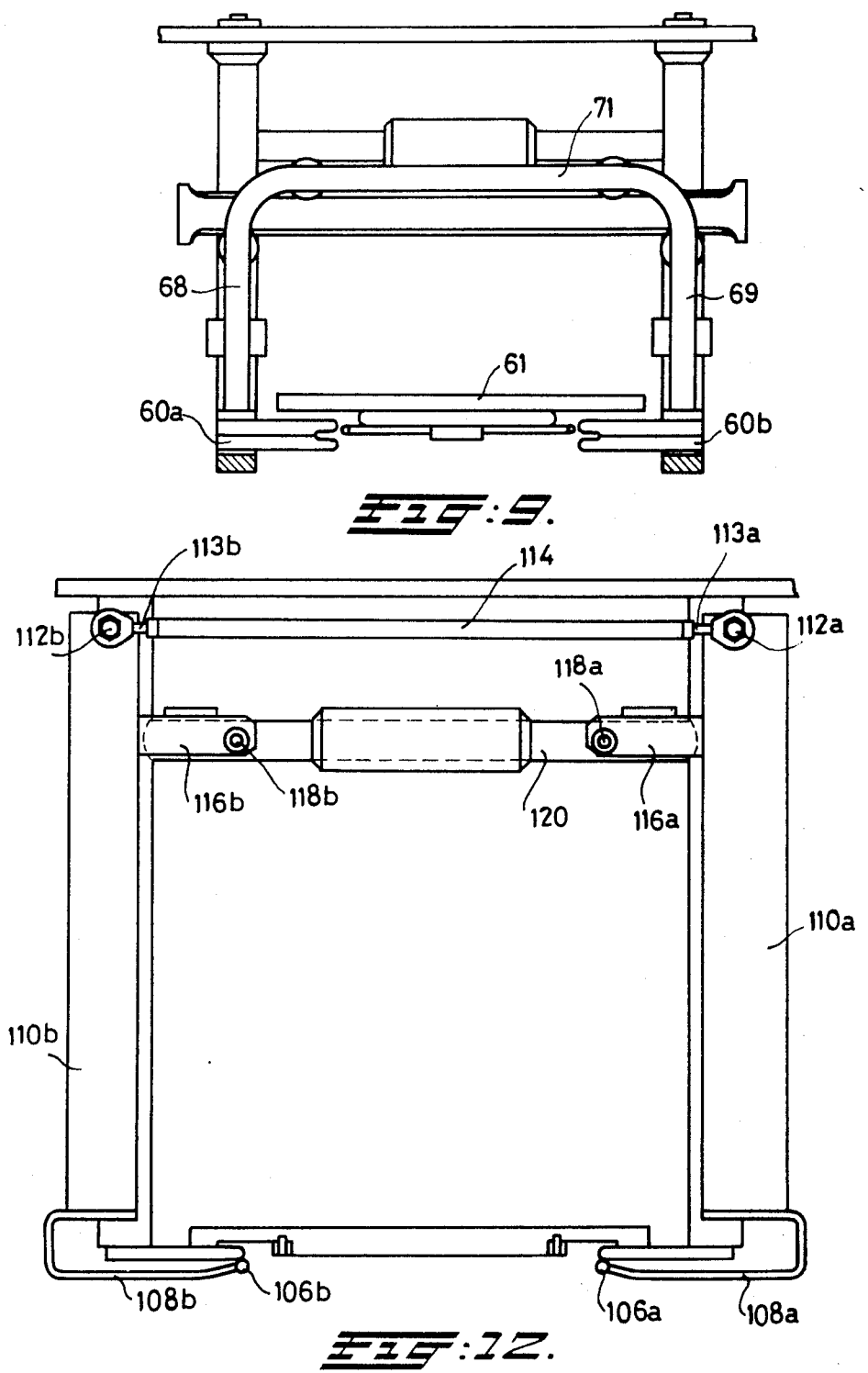
FIG. 9 is an end view of this embodiment.

FIGS. 7, 8 and 9 relate to an embodiment of the type schematically illustrated in FIG. 4 in conjunction with a drive element, as shown in FIG. 6. They show respectively a top view and a side view of this ejection station, which is disposed at the beginning of a processing line comprising several processing stations, in which a poultry carcass hanging by the legs is subjected to a number of successive dividing-up operations in the processing stations. Such a processing line is known per se in the art, and it is clear that the operations to be carried out can be carried out properly only if the carcass is in fact hanging by two legs. A bird hanging by only one leg is divided into unusable pieces.

The ejection station according to the invention is disposed at the beginning of a conveyor track, which comprises the two outer guides 60a and 60b, which mate with a carrier of the type illustrated in FIGS. 6 and 7 and indicated there by reference number 61.

The plant is designed with the outer feed guides 62, 63 and the inner feed guides 64, 65 situated opposite them; disposed shortly after the infeed end is a V-shaped leaf spring 66, which serves to restrain the legs of the birds temporarily by spring-action, so that the bird comes to rest exactly at right angles to the longitudinal central plane 67. Shortly past the ends of the spring 66 the fixed outer guides 62 and 63 end, and disposed between the end thereof and the beginning of the fixed outer guides 60a and 60b are the supporting elements 66, 67, which are provided on the free ends of the vertical legs 68 and 69 of a yoke 70, the horizontal leg 71 of which is movably guided on the fixed support 74 by means of the pairs of rollers 72, 73 in a direction transverse to the direction of conveyance. Viewed in the direction of movement of the poultry, provision is made before this yoke—symmetrically relative to the longitudinal central plane 67—for a second V-shaped spring 75 whose two legs 76, 77 cross the path to be followed by the bird legs at an acute angle.

The operation is as follows:

The legs 80, 81 of the poultry fed in are guided initially between the guides 62, 64, on the one hand, and 63, 65 on the other; they are pushed forwards by the edges 61a, 61b of the carrier 61. After being directed by the action of the spring 66, the legs arrive in the spaces 82, 83 where the function of the guides 64, 65 is taken over by the supporting edges 61c, 61d of the carrier 61 (cf. FIG. 6). When the poultry is hanging by both legs, equal outward-directed forces are exerted on it when it is passing the supporting elements 66, 67, so that the legs pass said supporting elements unimpeded, and the bird is not ejected. If, however, the bird is hanging by on leg, an outward-directed force will be exerted only on the supporting element situated at the same side as that leg; the supporting element can give way to the outside and the bird falls away downwards.

The spring legs 76, 77 exert an additional outward-directed force on the legs of the poultry, so that when a bird hanging by one leg passes, the supporting element situated at the same side as that particular leg will certainly give way outwards.

Figure 10:
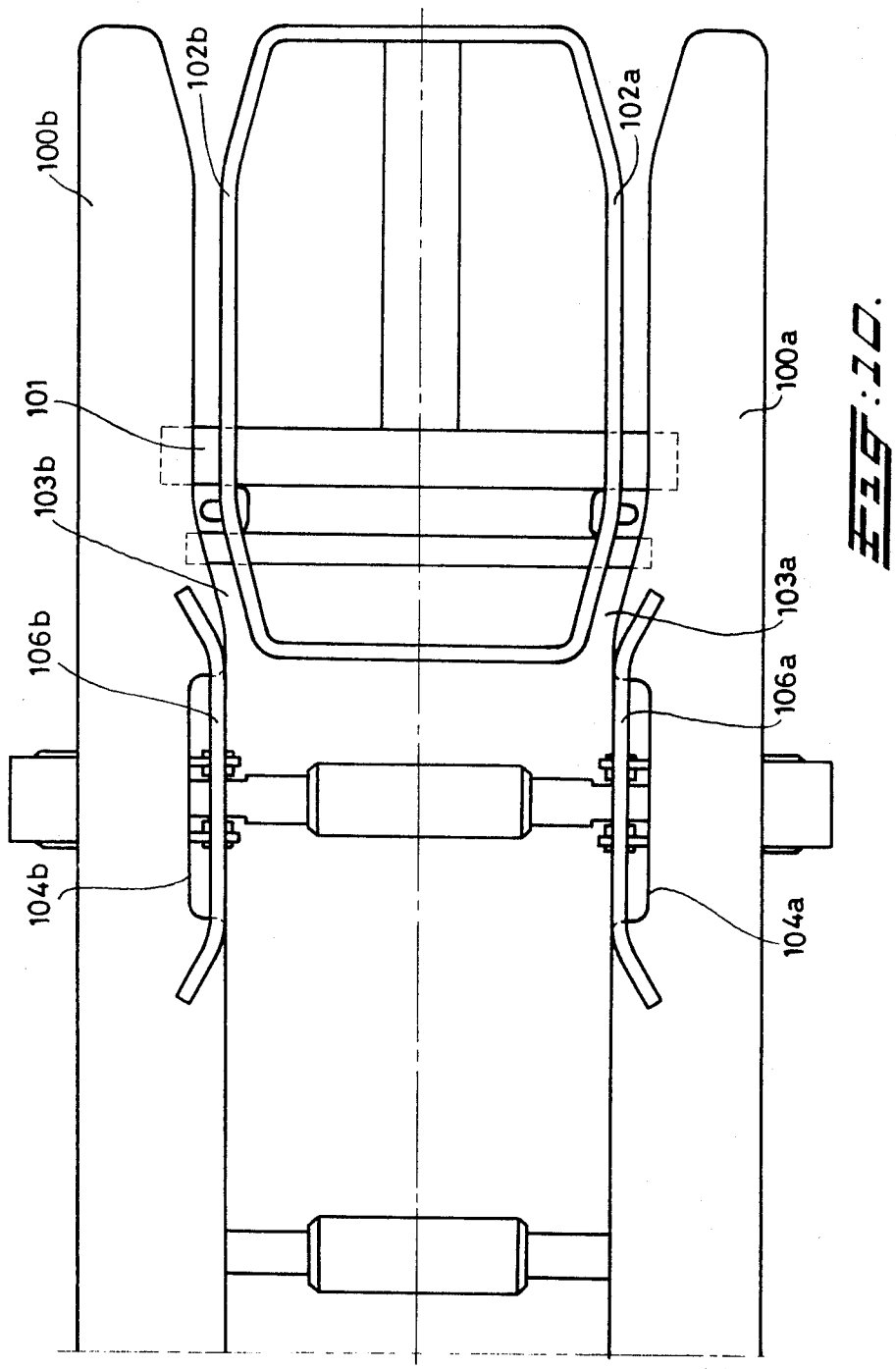
FIG. 10 is a top view of a second practical embodiment according to the invention.

FIGS. 10, 11 and 12 relate to an embodiment in which the rocking yoke in FIG. 5 is used in combination with a guide of the type shown in FIG. 6. The layout is as follows:

As FIG. 10 shows, use is also made here of two fixed outer guides 100a, 100b in conjunction with carriers 101 of the type illustrated in FIG. 6. Each outer guide 100a, 100b cooperates near the infeed end with a feed guide 102a, 102b, and shortly past the positions 103a, 103b, where the supporting function of the infeed guides 102a, 102b is taken over by the edges of the carrier 101 a recessed part 104a, 104b is formed in each of the outer guides 100a, 100b; said recessed part contains the supporting elements 106a, 106b, each connected by means of a connecting arm 108a, 108b to the bottom end of a rocking arm 110a 110b, the top ends of said rocking arms being connected by means of hinges 112a, 112b to a connecting rod 114. The length between the hinge points 112, 113 is preferably adjustable by the use of a connecting rod 114 with internal screw thread, mating with the screw thread ends 113a, 113b, connected to the hinge loops 112a, 112b.

The rocking rods 110, 111 are connected to short arms 116a, 16b, each of which is connected by means of a hinge 118a, 118b to a fixed rod 120 of the frame of the device.

This embodiment operates in the manner as explained with reference to FIG. 5: when a bird hanging by both legs is fed in, equal outward-directed forces are exerted on the supporting elements 106a, 106b, so that the position of said supporting elements will not change, and the bird passes the supporting elements unimpeded. If, however, a bird is fed in hanging by only one leg, the supporting element situated at the same side as that leg will give way to the outside when the leg is passing, so that the bird falls away downwards.

FIG. 13 is a top view of an embodiment in which the movable supporting elements are incorporated in the inside guides; FIG. 14 is a side view of these inside guides. The embodiment illustrated in FIGS. 13 and 14 is intended for a conveyor track in which the poultry is moved forward in the direction of the arrow 130; this embodiment has the uninterrupted outer guides 131, 132 and the inner guide 133 with the guide edges 134 and 135; this inner guide is interrupted at the point 136, and at that point there is in a direction which is transverse to the direction of movement 130 a slidable plate-shaped part 137, the longitudinal edges 138, 139 of which form the supporting element. The element 137 has a recess 140, whose transverse edges 141, 142 cooperate with the rollers 143, the shafts of which are attached to the bridge 144. This bridge 144 is fixed to the guide 133 and by means of the carrying rod 145 carries a supporting part 146 with rollers 147. The element 137 is thus supported and guided.

The element 137 carries on its front end a narrowing lead-in part 150 situated under the track 133; when the element 137 is moved out of the central position, the lead-in part 150 will partially project into the space between inner guide and one of the outer guides; when the next bird passes, its legs press the element 137 back into the central position by means of the lead-in part 150.

What is claimed is:

1. An automatic ejection device for the removal of a poultry carcass suspended by a single leg from a conveyor track guide system having a plurality of outer and inner parallel elongated guide surfaces for supporting both legs of the poultry carcass while being moved along by the pushing action of a driver extending across the upper side of the guides in which either the inner or the outer elongated guide surfaces have a gap disposed along their length, wherein the ejection device comprises:

a plurality of guide elements oppositely situated in said gaps of said elongated guide surfaces and moveable transversely to said elongated guide surfaces;

connecting means for joining said plurality of guide elements to permit unidirectional movement of said guide elements in a direction transverse to the elongated guide surfaces when only a single leg of said poultry carcass is suspended in said conveyor track.

2. The ejection device of claim 1 wherein the connecting means includes:

a horizontal crossbar;

a pair of vertical legs each having an upper end fastened to said crossbar and a lower end connected to one of said guide elements.

3. The ejection device of claim 1 wherein the connecting means includes:

a horizontal coupling rod;

a pair of vertical legs each having an upper end hingedly connected to said horizontal coupling rod and a lower end connected to said guide elements;

a pair of support structures for hingedly connecting each vertical leg at an intermediate position between said upper and lower end.

4. The ejection device of claim 1 further comprising a pair of spring elements disposed below the conveyor tracks, crossing said conveyor tracks at an acute angle at each guide element and acting upon the legs of said poultry carcass to exert a force directed toward each guide element.

5. The ejection device of claim 1 wherein the connecting means includes a plurality of cross members connected transversely to said guide elements to form a plate-like structure, said structure being moveable transversely to said elongated guide surfaces.

* * * * *